United States Patent [19]

Baugh

[11] 4,328,826

[45] May 11, 1982

[54] UNDERWATER FLUID CONNECTOR

[75] Inventor: Hollis A. Baugh, Hempstead, Tex.

[73] Assignee: Koomey, Inc., Houston, Tex.

[21] Appl. No.: 202,086

[22] Filed: Oct. 30, 1980

[51] Int. Cl.³ .............................................. E21B 33/06
[52] U.S. Cl. ................................. 137/236 S; 137/594;
  137/798; 137/884; 166/341; 285/25; 285/131
[58] Field of Search ...................... 137/236, 315, 454.2,
  137/594, 595, 597, 798, 884; 166/338, 341, 343,
  344; 285/24, 25, 27, 28, 131, 132, DIG. 21

[56] References Cited

U.S. PATENT DOCUMENTS

| | | | |
|---|---|---|---|
| 2,923,311 | 2/1960 | Jeffrey | 137/315 |
| 2,990,851 | 7/1961 | Jackson | . |
| 3,460,614 | 8/1969 | Burgess | . |
| 3,481,396 | 12/1969 | Williams | 136/341 X |
| 3,486,556 | 12/1969 | Burgess | . |
| 3,648,719 | 3/1972 | Orieux | 137/595 X |
| 3,701,549 | 10/1972 | Koomey | . |
| 3,817,281 | 6/1974 | Lewis | . |
| 3,820,600 | 6/1974 | Baugh | . |
| 3,840,071 | 10/1974 | Baugh | 166/344 X |
| 3,957,079 | 5/1976 | Whiteman | 166/338 X |

*Primary Examiner*—Robert G. Nilson
*Attorney, Agent, or Firm*—Fulbright & Jaworski

[57] ABSTRACT

An underwater connector for interconnecting a plurality of fluid power and control lines for controlling and actuating underwater equipment. The connector includes one or more members adapted to be positioned underwater some each of which includes a vertically positioned flat surface with a plurality of fluid passageways terminating at the flat surfaces of the members. Another member is adapted to engage and disengage from underwater members and also includes one or more vertically positioned flat surface for mating with the flat surfaces of the underwater members and includes a plurality of passageways terminating at the other member flat surface for sealingly mating with the passageways of the underwater members. Coacting cam means are provided between the underwater members and the retrievable member for horizontally moving the underwater members into a sealing relationship with the retrievable member as they move vertically together. Releasable locking means lock the retrievable member with the underwater members. Supports for the underwater members allow limited horizontal movement of the members, individually and jointly. Hydraulic fluid supply and control lines extending to the water surface are connected to some of the passageways in the underwater members for actuating control valves in the retrievable member.

11 Claims, 5 Drawing Figures

4,328,826

UNDERWATER FLUID CONNECTOR

BACKGROUND OF THE INVENTION

The present invention is directed to an underwater connector such as the type commonly used in underwater well drilling operations for actuating and controlling various wellhead functions and in particular subsea blowout preventer control systems.

The underwater wellhead equipment is controlled by hydraulic fluid. Various devices have been used in the past for controlling the actuation of the wellhead equipment at the wellhead such as using a female receptacle which is connected by a plurality of fluid passageways to the wellhead equipment and a coacting male member which is releasably connected to the female member. The male member generally includes control valves which are connected to fluid supply and control lines from the water surface for actuation and controlling the wellhead equipment.

Various configurations of underwater connectors have been used in the past but they have been expensive, complicated, required considerable time and expense in connection and releasing, and the underwater engaging surfaces were generally directed upwardly and subject to accumulation of debris.

The present invention is directed to an improved underwater fluid connector.

SUMMARY

The present invention is directed to an underwater connector for interconnecting a plurality of fluid lines and includes a first member adapted to be positioned underwater in which the first member includes at least one vertically positioned flat plate having a plurality of fluid passageways terminating at said surface. A second member is adapted to engage and disengage from the first member and the second member includes at least one vertically positioned flat surface for mating with the first member flat surface and includes a plurality of passageways terminating at the second member flat surface for sealingly mating with the first member passageways. Coacting cam means are provided between the first and second members for horizontally moving the first and second members together in a sealing relationship as they move vertically together. Releasable locking means lock the first and second members together. Preferably the first member is supported for providing limited horizontal movement while maintaining the first member flat surface vertical. Preferably the cam means include coacting cam means at each end of the flat surfaces of the first and second members.

A still further object of the present invention is the provision wherein the underwater portion of the underwater connector includes first and second members spaced apart each of which includes a vertically positioned flat surface and a plurality of fluid passageways in each member terminating at the flat surface of each member. A retrievable or third member is adapted to engage and disengage from the first and second members and includes first and second vertically positioned flat plates for sealingly coacting respectively with the flat surfaces of the first and second members. The third member includes a plurality of passageways terminating in each of the third member flat surfaces for mating with the fluid passageways in the first and second members. The first and second members are supported for allowing limited horizontal movement of the first and second members individually and jointly while maintaining their flat surfaces vertical. Coacting cam surfaces are provided, preferably between the ends of the third member and the ends of the first and second members for horizontally moving the first and second members and said third member together in a sealing relationship as the third member moves vertically relative to the first and second members.

A still further object of the present invention is the provision wherein the retrievable member includes a plurality of pilot control valves in communication with the fluid passageways in the retrievable member for controlling fluid flow in some of the passageways and being controlled by fluid flow in other of the passageways. Hydraulic power and control lines extending from the water surface are connected to the fluid passageways of the underwater positioned member or members for providing fluid control of the valves and supplying fluid to be controlled by the valves whereby the fluid lines need not be connected to the retrievable member thereby allowing the retrievable member to be retrieved for repairing the valves and seals without requiring retrieval of the hydraulic line and further allows the hydraulic lines to be more permanently secured from other equipment for protecting them from damage. In addition, a fluid disconnect junction is connected in the hydraulic line control lines and positioned underwater for allowing ease of removal of the fluid line if desired.

Other and further objects, features and advantages will be apparent from the following description of a presently preferred embodiment of the invention, given for the purpose of disclosure and taken in conjunction with the accompanying drawing.

BRIEF DESCRIPTION OF THE PREFERRED EMBODIMENT

Figure 1:
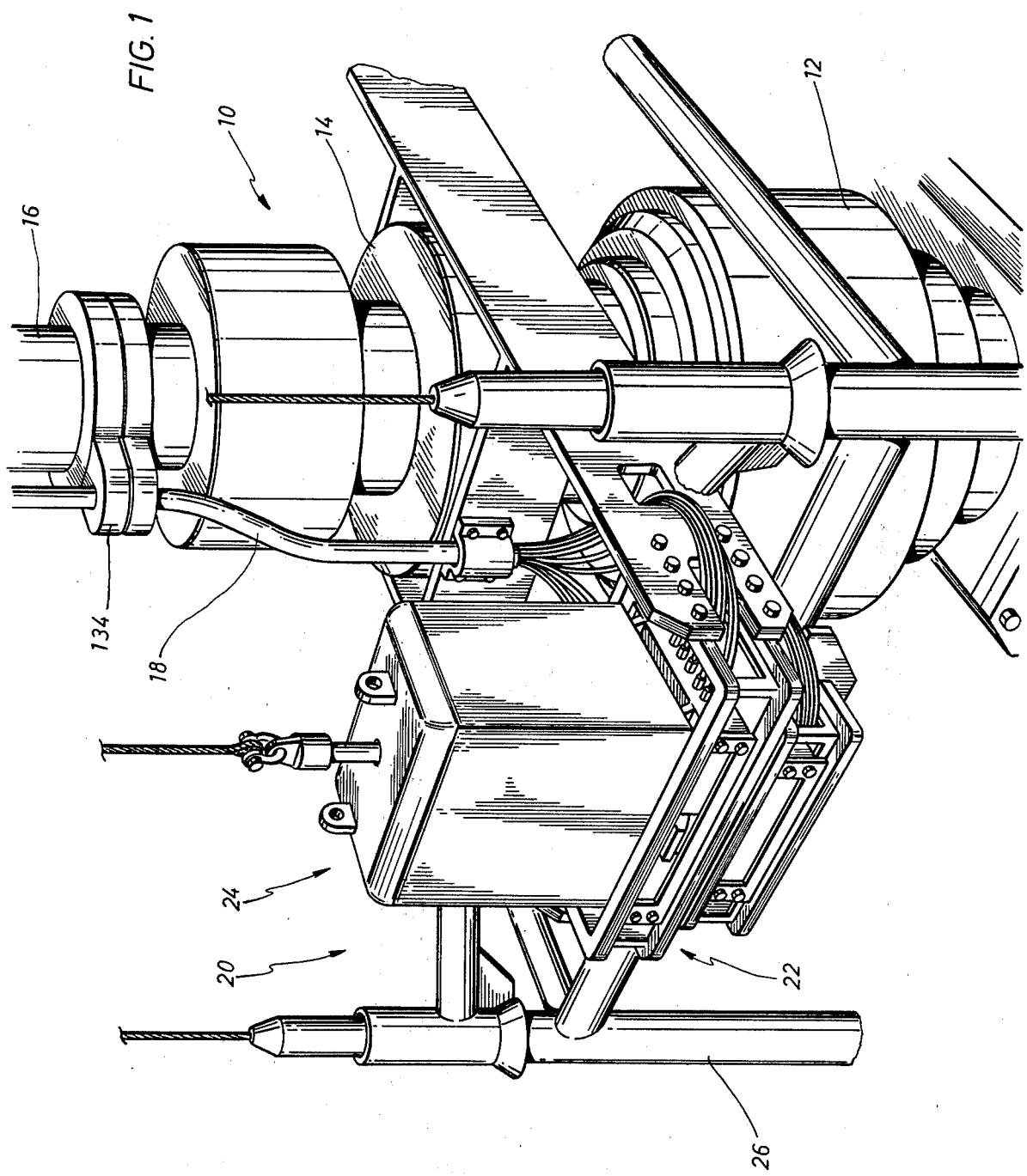
FIG. 1 is a perspective elevational view of the present invention positioned on an underwater blowout preventer stack.

Referring now to FIG. 1, the reference numeral 10 generally indicates a conventional blowout preventer stack 10 including a blowout preventer 12, a hydraulic riser connector 14 and a mechanical riser connector 16, leading to the water surface. Various portions of the stack 10, such as the blowout preventer 12, are actuated by a hydraulic fluid supply and control line 18 leading to the water surface.

The present invention is directed to an underwater connector generally indicated by the reference numeral 20 which includes an underwater portion generally indicated by the reference numeral 22 which is adapted to be positioned and remain underwater, and a retrievable portion, generally indicated by the reference numeral 24 which is adapted to be releasably engaged and disengaged from the underwater portion 22. A suitable frame 26 is provided connected to the wellhead 10 for providing support and guide means for the connector 20.

Figure 2:
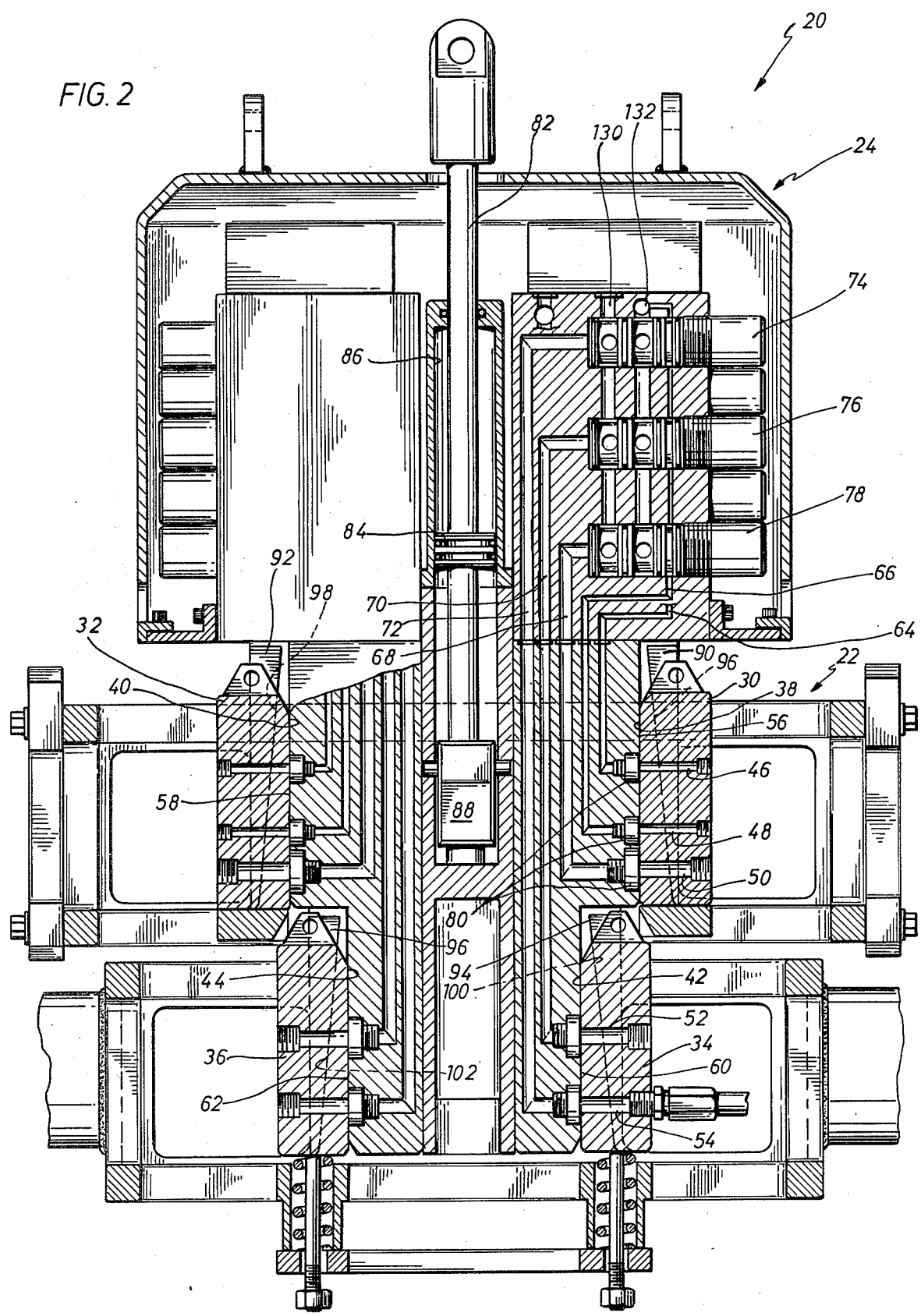
FIG. 2 is a cross-sectional view of the underwater connector of the present invention in engagement.

Referring now to FIG. 2, the underwater portion 22 of the connector 20 includes at least one member, and preferably four members 30, 32, 34, and 36, adapted to be positioned underwater. The members 30 and 32 are spaced apart from each other and the members 34 and 36 are spaced apart. Each of the members, 30, 32, 34 and 36 include a vertically positioned flat surface, 38, 40, 42 and 44, respectively. Each of the members also include a plurality of fluid passageways terminating at their respective surfaces. Thus, member 30 includes fluid passageways 46, 48, and 50, and member 34 includes fluid passageways 52 and 54. The retrievable member 24 which is adapted to engage and disengage from the members 30, 32, 34 and 36 includes at least one vertically positioned flat surface 56, 58, 60, and 62, for mating with the flat surfaces, 38, 40, 42 and 44, respectively. In addition, the retrievable member 24 includes a plurality of fluid passageways terminating at the flat surfaces 56, 58, 60 and 62 and positioned to sealingly mate with the passageways in the members 30, 32, 34 and 36. Thus, the retrievable member 24 includes fluid passageways 64, 66, and 68 which terminate at flat surface 56 for mating with passageways 46, 48 and 50, respectively, of member 30. In addition, member 24 includes passageways 70 and 72 which terminate in flat surface 60 and mate with passageways 52 and 54 of member 34. Any suitable number of fluid power and control passageways can be provided depending upon the number of functions to be performed. Additionally, member 24 includes a plurality of suitable pilot control valves such as 74, 76, and 78 for being controlled by certain fluid passageways and controlling other fluid passageways. Additionally, suitable seals are provided, preferably on the retrievable member 24 such as seals 80 for sealing against the members 30, 32, 34 and 36. In addition, the retrievable member 24 includes releasing locking means 82 having a piston 84 movable in a cylinder 86 for actuating a locking lug 88 to the underwater portion 22.

It is noted that all of the flat surfaces 38, 40, 42 and 44 which are positioned underwater are in a vertical position and are therefore less likely to be subject to the accumulation of debris when the movable member 24 is not in position. The flat surfaces 56, 58, 60 and 62 mate with and are disengaged from the flat surfaces 38, 40, 42 and 44, respectively, as the member 24 engages and disengages from the underwater member 22. In order to insure that the coacting mating flat surfaces sealingly engage upon mating and easily disengage to avoid wear on the sealing surfaces, at least one and preferably all of the members 30, 32, 34 and 36 are supported for limited horizontal movement. In addition, coacting cams are provided between the retrievable member 24 and the members 30, 32, 34 and 36 for horizontally moving the mating flat surfaces together in a sealing relationship as the retrievable member 24 moves vertically relative to the members 30, 32, 34 and 36. Suitable cam means such as wedges 90, 92, 94, and 96, may be provided on the retrievable member 24 for coacting with wedges 96, 98, 100, and 102 on each end of the members 30, 32, 34 and 36.

Figure 3:
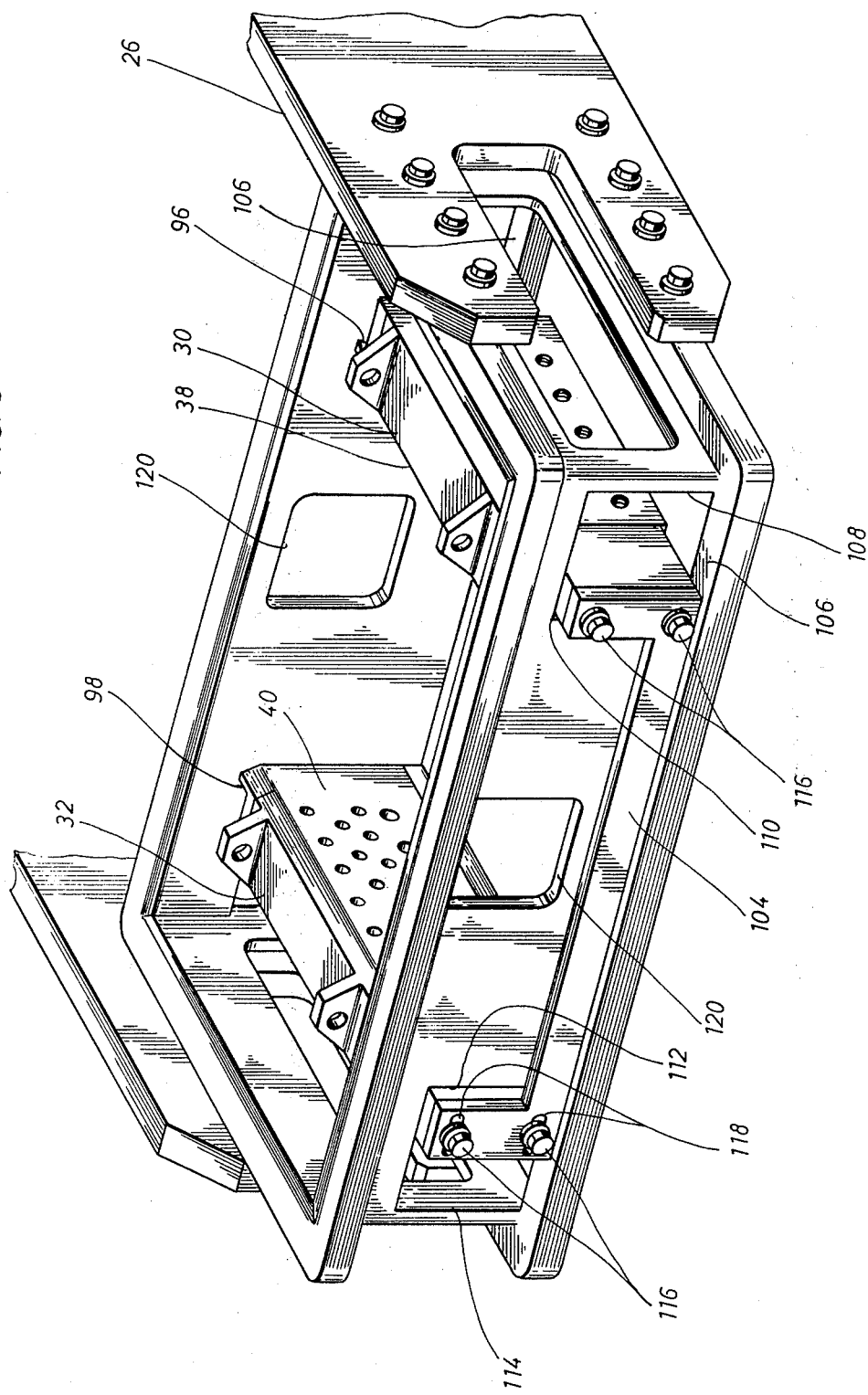
FIG. 3 is a perspective elevational view of an underwater positioned member of the present invention.

Referring now to FIG. 3, members 30 and 32 are shown supported from the support 26 for limited horizontal movement. Thus, members 30 and 32 are connected together on a frame 104 which is horizontally slideable in the support 26 on tracks 106. However, the horizontal extent of the movement of frame 104 is limited by shoulders 108, 110, 112 and 114 on the support 26. Thus, the members 30, 32 and similarly members 34 and 36 may jointly move horizontally to receive and engage with upper member 24. It is noted that the frame 104 is connected to the ends of members 30 and 32 by bolts 116. A lost motion connection is provided by providing elongated slots 118 in the frame 104 and the connection of at least one of the members such as 32 to the frame 104. The lost motion connection therefore while allowing the members 30 and 32 to be moved jointly, also allows the members 30 and 32 (and similarly members 34 and 36) to be moved individually, but at the same time maintaining the flat surfaces 38 and 40 in a vertical position and parallel to each other. Also, as seen in FIG. 3, the frame 26 provides locking notches 120 for receiving the locking lug of the locking mechanism 82 of FIGS. 2 and 5.

Figure 4:
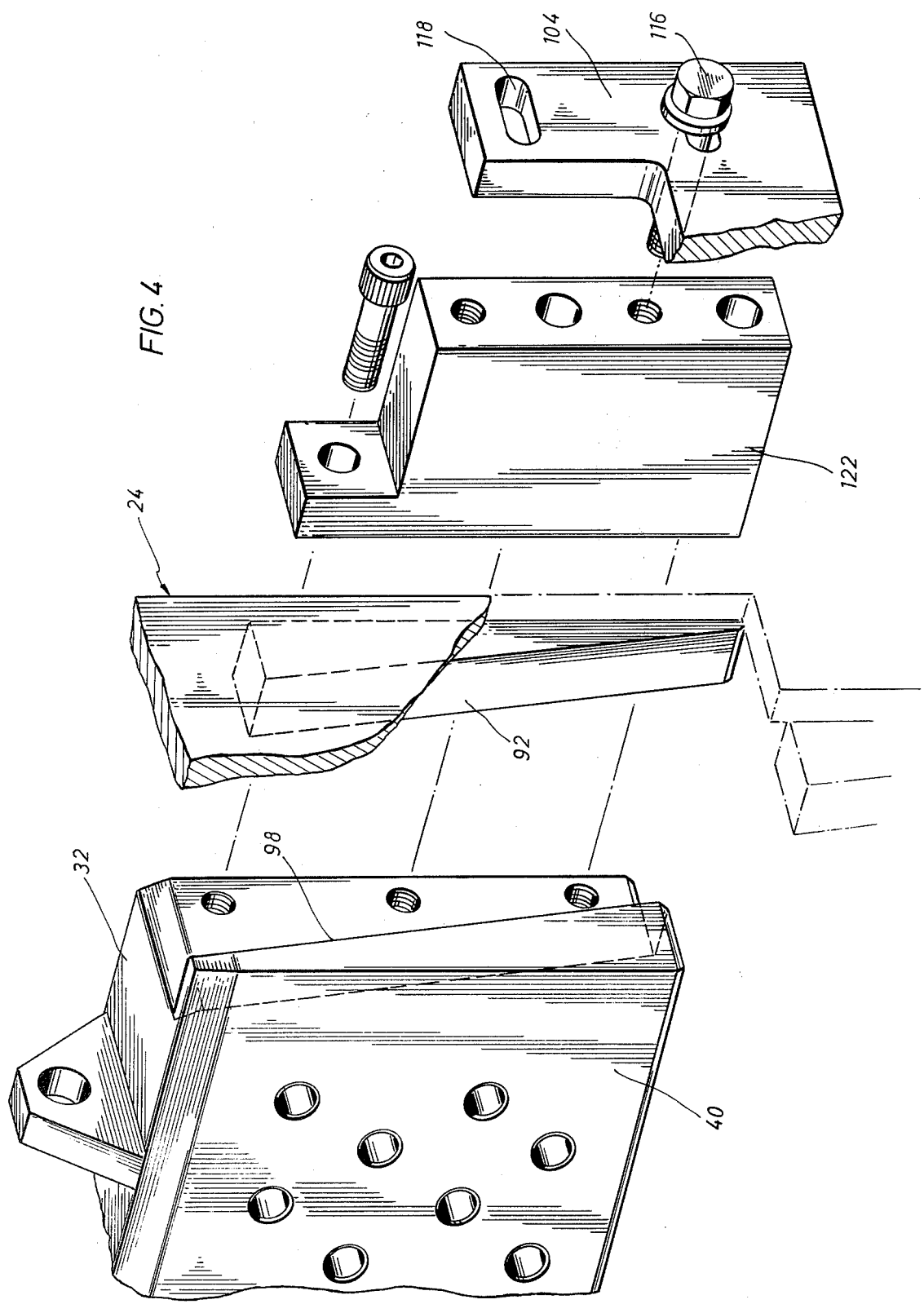
FIG. 4 is an exploded perspective view illustrating the support and camming arrangement of the underwater portion of the connector.

Referring now to FIG. 4, one end of one of the underwater members such as 32 is best seen to which a block 122 is connected to provide a sliding movement on the tracks 106 of the frame 26 and also showing the connection of the movable frame 104. In addition, wedge member 98 is more clearly illustrated which coacts with its corresponding wedge member 92 on the retrievable member 24. Also it is noted from FIGS. 3 and 4, that as the member 24 is moved vertically downwardly into the underwater portion 22 of the connector 20 that the wedge surfaces 90, 92, 94 and 96 on the member 24 at each end of the members 30, 32, 34 and 36 will mate with and coact with the wedge surfaces 96, 98, 100 and 102 to bring the members 30, 32, 34 and 36 into a sealingly engagement with the member 24. And upon upward movement of the member 24, the members 30, 32, 34 and 26 will quickly be released.

Another important feature of the present invention is the provision of connecting the hydraulic supply and control lines 18 (FIG. 1) to the underwater member 22 instead of to the retrievable member 24 as is conventional. By re-arranging the hydraulics, retrievable member 24 may be retrieved for the inspection and repair of its parts such as the pilot control valves and seals without the time-consuming necessity of retrieving the power supply and control cable 18. Thus, the cable 18 is connected directly to at least some of the passageways in the underwater members 30, 32, 34 and 36, such as passageways 46, 48 and 50, whereby some of the passageways such as 46 and 48 are pilot controlled passageways for controlling the actuation of the pilot control valve such as 78 and 76. Other passageways such as 50, 70 and 72 supply the power to actuate or vent wellhead devices such as the blowout preventer.

Other passageways (not shown) are connected to the power manifold 130 and vent manifold 132 in the member 24 for supplying power and venting the power fluid. Another advantage of this feature is that it allows the hydraulic fluid and power control line 18 to be strapped to the riser 16 and protect the delicate hydraulic lines from wear and tear and damage from other equipment. However, a suitable hydraulic junction disconnect 134 is provided whereby the upper portion of the hydraulic control and fluid supply line 18 may be disconnected if desired.

Figure 5:
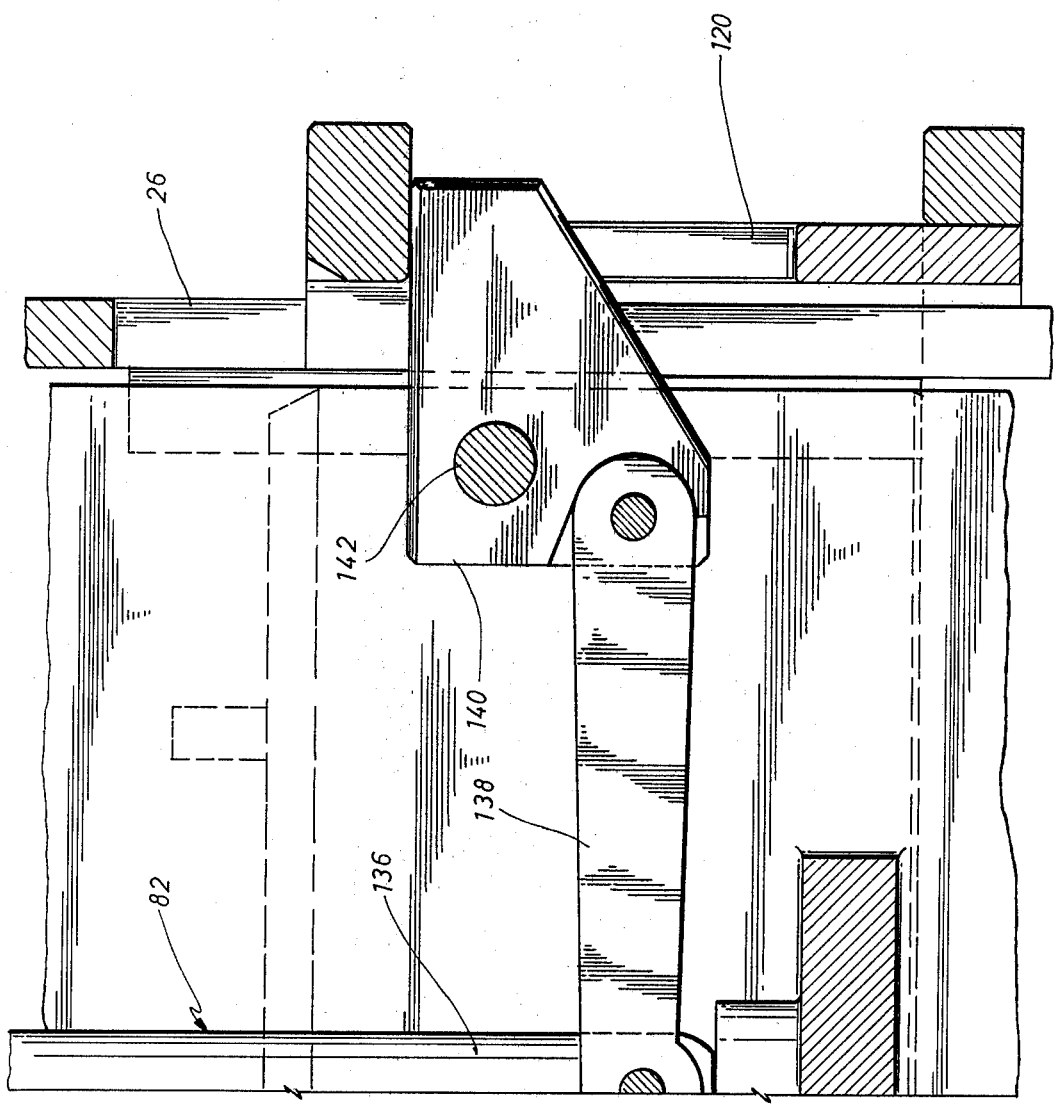
FIG. 5 is a fragmentary elevational view, partly in cross section, illustrating the releasable locking mechanism of the present invention.

Referring now to FIG. 5, actuation of the releasable locking mechanism 82 actuates a shaft 136 which controls the movement of a lever arm 138 which in turn moves a locking dog 140 about a pivot 142 to cause the locking dog 140 to engage or disengage from the locking notch 120 of the support 26.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An underwater connector for interconnecting a plurality of fluid lines comprising,
   a first member adapted to be positioned underwater, said member including at least one vertically positioned flat surface having a plurality of fluid passageways terminating at said surface,
   a second member adapted to engage and disengage from said first member, said second member including at least one vertically positioned flat surface for mating with the first member flat surface and having a plurality of passageways terminating at said second member flat surface for sealingly mating with the first member passageways,
   coating cam means between said first and second members for horizontally moving the first and second member together in a sealing relationship as they move vertically together, and
   releasable locking means for releasably locking the first and second members together.

2. The apparatus of claim 1 including, support means for the first member allowing limited horizontal movement while maintaining the first member flat surface vertical.

3. The apparatus of claim 1 including, hydraulic supply and control lines extending to the water surface connected to some of the fluid passageways of said first member.

4. The apparatus of claim 1 wherein the cam means includes coacting cam means at each end of the flat surfaces of the first and second members.

5. An underwater connector for interconnecting a plurality of fluid lines comprising,
   first and second spaced apart members adapted to be positioned underwater, said members each including a vertically positioned flat surface, a plurality of fluid passageways in at least one member terminating at the flat surface of said member,
   support means connected to said members allowing limited horizontal movement of said members while maintaining said members vertical,
   a third member adapted to engage and disengage from said first and second members, said third member including first and second vertically positioned flat surfaces for coacting respectively with the flat surfaces of the first and second members, said third member having a plurality of passageways in at least one of the third member flat surfaces for sealingly mating with the fluid passageways in at least one of the third member flat surfaces for sealingly mating with the fluid passageways in the first and second members,
   coacting cam means between the third member and the first and second members for horizontally moving the first and second members and said third member together in a sealing relationship as they move vertically together, and
   releasable locking means for releasably locking the third member to the first and second members.

6. The apparatus of claim 5 wherein the support means allowing limited horizontal movement of the first and second members allows the first and second members to move individually and jointly.

7. The apparatus of claim 5 including,
   hydraulic supply and control lines extending to the water surface connected to some of the passageways in the first and second members.

8. The apparatus of claim 6 wherein the support means includes,
   a horizontally movable support connected to and supporting each of the first and second members, and
   a horizontally movable lost motion connection between one of the members and the movable support.

9. An underwater connector for interconnecting a plurality of fluid lines comprising,
   first and second spaced apart members adapted to be positioned underwater, said members including a vertically positioned flat surface, a plurality of fluid passageways in each member terminating at the flat surface of said member,
   support means connected to said members allowing limited horizontal movement of said members individually and jointly while maintaining said flat surfaces vertical,
   a third member adapted to engage and disengage from said first and second members, said third member including first and second vertically positioned flat surfaces for sealingly coacting respectively with the flat surfaces of the first and second members, said third member having a plurality of passageways terminating in each of the third member flat surfaces for mating with the fluid passageways in the first and second members,
   coacting cam means between the ends of the third member and the ends of the first and second members for horizontally moving the first and second members and said third member together in a sealing relationship as the third member moves vertically relative to the first and second members, and
   releasable locking means for releasably locking the third member to the first and second members.

10. The apparatus of claim 9 including,
    control valves positioned in said third member and in communication with the passageways in the third member,
    hydraulic supply and control lines extending to the water surface connected to some of the passageways in the first member for supplying hydraulic supply fluid to said valves and controlling the actuation of the valves.

11. The apparatus of claim 10 including,
    a fluid disconnect connected to the hydraulic supply and control lines and positioned adjacent the first and second members.

* * * * *